(12) United States Patent
Rosa

(10) Patent No.: US 7,430,830 B1
(45) Date of Patent: Oct. 7, 2008

(54) FLY SWATTER WITH INTEGRAL DISPOSAL MEANS

(76) Inventor: John S. Rosa, 533 Murphy Dr., Republic, MO (US) 65738

( * ) Notice: Subject to any disclaimer, the term of this patent is extended or adjusted under 35 U.S.C. 154(b) by 102 days.

(21) Appl. No.: 11/496,862

(22) Filed: Aug. 1, 2006

Related U.S. Application Data

(60) Provisional application No. 60/704,629, filed on Aug. 2, 2005.

(51) Int. Cl.
A01M 3/02 (2006.01)
A01M 3/04 (2006.01)

(52) U.S. Cl. .......................... 43/137; 43/136
(58) Field of Classification Search ............... 43/137, 43/136, 114
See application file for complete search history.

(56) References Cited

U.S. PATENT DOCUMENTS

| | | | | |
|---|---|---|---|---|
| 884,213 A * | 4/1908 | Schmidt | ............ | 43/136 |
| 1,802,774 A * | 4/1931 | Nixon | ............ | 43/136 |
| 1,967,384 A * | 7/1934 | Urbanek | ............ | 43/137 |
| 1,991,836 A * | 2/1935 | Bailey | ............ | 43/137 |
| 2,578,183 A * | 12/1951 | Furst | ............ | 43/137 |
| 2,736,129 A * | 2/1956 | Roop | ............ | 43/137 |
| 3,816,956 A * | 6/1974 | Sekula | ............ | 43/114 |
| 4,120,114 A * | 10/1978 | Little et al. | ............ | 43/137 |
| 4,242,828 A * | 1/1981 | Schurger et al. | ............ | 43/137 |
| 4,653,222 A * | 3/1987 | Viscosi | ............ | 43/137 |
| 4,759,150 A * | 7/1988 | Pierce | ............ | 43/136 |
| 4,787,171 A * | 11/1988 | Dagenais | ............ | 43/137 |
| 4,905,408 A * | 3/1990 | Wu | ............ | 43/137 |
| 5,058,314 A * | 10/1991 | Frascone | ............ | 43/136 |
| 5,095,648 A * | 3/1992 | Keenan | ............ | 43/136 |
| 5,207,018 A * | 5/1993 | Reaver et al. | ............ | 43/137 |
| 5,269,092 A * | 12/1993 | Cobble | ............ | 43/137 |
| 5,351,436 A * | 10/1994 | Spalding et al. | ............ | 43/137 |
| 5,630,290 A * | 5/1997 | Wade et al. | ............ | 43/136 |
| 6,055,767 A * | 5/2000 | Carter | ............ | 43/137 |
| 6,067,746 A * | 5/2000 | Kistner et al. | ............ | 43/136 |
| 6,161,328 A * | 12/2000 | Sing | ............ | 43/137 |
| 6,185,862 B1* | 2/2001 | Nelson | ............ | 43/136 |
| 6,564,505 B1* | 5/2003 | Anderson | ............ | 43/136 |
| 6,651,379 B1* | 11/2003 | Nelson | ............ | 43/136 |
| 6,957,510 B1* | 10/2005 | Kominkiewicz | ............ | 43/137 |
| 7,065,919 B1* | 6/2006 | Vierra | ............ | 43/136 |
| 7,165,355 B2* | 1/2007 | George et al. | ............ | 43/136 |
| 7,210,265 B2* | 5/2007 | Jacobson | ............ | 43/136 |
| 2003/0024151 A1* | 2/2003 | Kremer | ............ | 43/136 |
| 2004/0163304 A1* | 8/2004 | Nelson | ............ | 43/136 |
| 2005/0132638 A1* | 6/2005 | Anderson et al. | ............ | 43/136 |
| 2005/0132639 A1* | 6/2005 | Anderson et al. | ............ | 43/137 |
| 2007/0169402 A1* | 7/2007 | Jacobson | ............ | 43/114 |

FOREIGN PATENT DOCUMENTS

| | | | |
|---|---|---|---|
| CA | 2162930 A | * | 12/1997 |
| DE | 29603177 U1 | * | 7/1996 |

(Continued)

*Primary Examiner*—Darren W Ark
(74) *Attorney, Agent, or Firm*—Robert C. Montgomery

(57) ABSTRACT

An improved fly swatter with an elongated handle portion and insect engaging section having means for collecting swatted insects. A plastic mesh swatting element is detachably affixed to the elongate handle and a replaceable stack of individually disposed adhesive pads comprises the opposite side of the swatting element. This eliminates the distasteful practice of hand collection of killed insects.

6 Claims, 2 Drawing Sheets

FOREIGN PATENT DOCUMENTS

| | | | | |
|---|---|---|---|---|
| GB | 1400451 | A | * | 7/1975 |
| JP | 06209685 | A | * | 8/1994 |
| JP | 09275873 | A | * | 10/1997 |
| JP | 10042768 | A | * | 2/1998 |
| JP | 2000316451 | A | * | 11/2000 |
| JP | 2006217851 | A | * | 8/2006 |
| JP | 2006320297 | A | * | 11/2006 |
| JP | 2007135576 | A | * | 6/2007 |
| WO | WO 9957976 | A1 | * | 11/1999 |

* cited by examiner

FLY SWATTER WITH INTEGRAL DISPOSAL MEANS

RELATED APPLICATIONS

The present invention was first described in U.S. Provisional Patent No. 60/704,629 filed on Aug. 2, 2005.

FIELD OF THE INVENTION

The present invention relates generally to fly swatters, and, more particularly, to a fly swatter having means to collect and dispose of swatted insects and debris in a sanitary method.

BACKGROUND OF THE INVENTION

The presence of flies, insects, and debris in a residential building or elsewhere is very unpleasant. Many devices for capturing or killing flies have been disclosed in the prior art. General recourse to their killing and removal from a household is to first kill them with a fly swatter, a rolled-up newspaper, etc., or by stepping on them if the insect is on the floor, and then removing the remains with a piece of paper, tissue or some implement. Such action generally results in the insect being partially or wholly squashed and thus smeared on the ceiling, wall, floor, etc. The practice of disposing swatted flies, insects, and debris is unhygienic and distasteful.

Several attempts have been made in the past to assist individuals in a more sanitary and effective manner in picking up and disposing of dead insects when struck with a fly swatter. U.S. Pat. No. 6,651,379 issued in the name of Nelson discloses a device for manually capturing and restraining intended insects comprising a pad of stacked singular sheets made of a collapsible sheet construction. The Nelson device is not designed to work concurrently with a fly swatter and is suited for use with live insects and is thus not in the scope of the present invention.

U.S. Pat. No. 6,185,862, also issued in the name of Nelson, describes a device similar to that mentioned in U.S. Pat. No. 6,651,379 and attachable to an elongated rod such as a fly swatter. This invention is not attached to the striking end of a fly swatter as in the present invention and also cannot be used concurrently as the striking surface to capture insects during the act of striking.

U.S. Pat. No. 6,161,328 issued in the name of Sing discloses a multi-functioning fly swatter and broom for swatting and sweeping struck flies and bugs away. The Sing device dose not include adhesive collecting means for grasping and disposing of struck insects as in the present invention.

U.S. Pat. No. 5,269,092 issued in the name of Cobble describes a trap structure configured as a fly swatter with a tubular handle with an attracting light leading the insect to an adhesive screen removable from a frame for removing the captured insect. The Cobble device does not provide for the added convenience of a stack of removable adhesive sheets such that the user can quickly provide another sheet for use. Also, the Cobble device utilizes an attractant to capture the insect and is therefore not under the scope of the present invention.

U.S. Pat. No. 5,207,018 issued in the name of Reaver et al. discloses a hand-held fly swatter with a transparent rigid housing on a distal end of a handle and defining a trap to capture live insects for subsequent disposal. The Reaver et al. device also does not utilize a stack of adhesive sheets to collect struck insects either on a planar surface or during the act of flight.

U.S. Pat. No. 4,759,150 issued in the name of Pierce discloses a fly or insect catcher having an appearance of a fly swatter comprising a sheet of adhesive material disposed on the head and a hingeably connected cover to cover the head when not in use. The Pierce design also utilizes an insecticide disposed on the cover to aid in the killing of the insect and is thus not in the scope of the present invention.

U.S. Pat. No. 5,058,314 issued in the name of Frascone describes a one-piece, folding, adhesive insect catcher with a head portion comprising adhesive disposed on the inside of the head portion and a handle. The Frascone device does not provide means to removably detach and dispose of a singular adhesive sheet with a struck insect thereon as in the present invention.

Accordingly, there has been a need for a simple, hygienic, and convenient apparatus which provide the means for disposal of flies, insects, and debris in a simple, effective, and convenient manner and eliminate the distasteful practice of hand collection and disposal of swatted flies, insects, and debris.

SUMMARY OF THE INVENTION

In view of the foregoing disadvantages inherent in the prior art, it has been observed that there is need of a device to assist in the sanitary and effective means to pick up and dispose of struck insects and other animals such as spiders, centipedes, and the like.

It has also been observed that there is a need to combine grasping and disposing articles with a conventional fly swatter such that both commonly used devices are combined into a common apparatus.

Therefore, it is an aspect of the present invention to provide a fly swatter which not only provides the means for disposal of flies, insects, and debris in a simple, effective, and convenient manner but also eliminates the distasteful practice of hand collection and disposal of swatted flies, insects, and debris.

In another aspect of the present invention, a fly swatter system comprises: a head portion having a reinforcing portion that have a bottom central portion with an extension thereof, a tapered neck portion extends from the bottom central portion, a mesh grid pattern having a plurality of grid holes to generate additional speed during operation of the system, a replaceable stack of singularly disposed double-sided adhesive sheet pads, each of the sheet pad has a plurality of orifices and a pull tab mounted on the sheet pad to facilitate removal of the sheet pad from the remainder of the stack, and a connection flange for coupling the head portion and the handle.

In another aspect of the present invention, a fly swatter system comprises: a detachable elongate handle having an upper and a lower portion, a mounting formed on the opposite end of the head portion to hang the system off a hook or similar apparatus, a flared neck portion and a groove for coupling the head portion.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
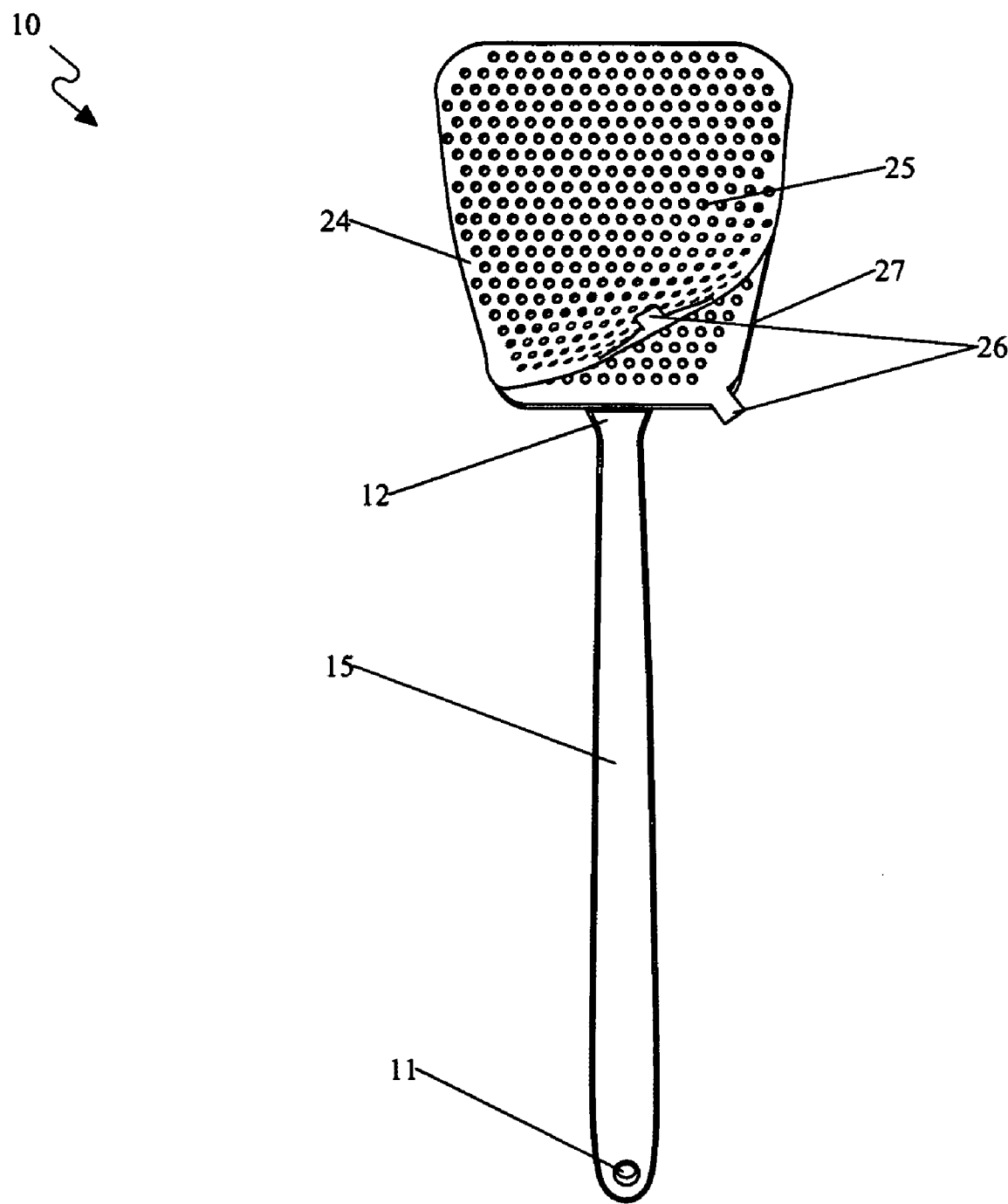
FIG. 1 is a perspective view of a fly swatter with integral insect disposal system 10, according to a preferred embodiment of the present invention; and, FIG. 2 is an environmental view of the elongate handle portion 15, according to a preferred embodiment of the present invention; and, FIG. 3a is front view of the head portion 20, according to a preferred embodiment of the present invention; and, FIG. 3b is a rear view of the head portion 20, according to a preferred embodiment of the present invention.

DESCRIPTIVE KEY 10 fly swatter with integral insect disposal system
11 mounting means
12 flared neck
13 groove
14 reinforcing solid portion
15 elongate handle swatter head
21 grid hole
22 mesh grid
23 tapered neck
24 adhesive sheet orifices
26 pull tab
27 adhesive sheet stack
28 connection flange

DETAILED DESCRIPTION OF THE PREFERRED EMBODIMENT

The best mode for carrying out the invention is presented in terms of its preferred embodiment, herein depicted within FIGS. 1 through 3b. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a system and method that discloses an improvement over the conventional fly swatter. The fly swatter with integral insect disposal system (herein described as the "system") 10 comprises an elongate handle 15, a detachable head portion 20 comprising a stack of double-sided adhesive sheets 27, and an integral insect disposing means. The elongate handle portion 15 is envisioned to be fabricated of plastic in an injection molding process or made of metallic wire in a bending and forming process. The swatter head 20 of the system 10 is envisioned to be fabricated of plastic in an injection molding process.

Figure 2:
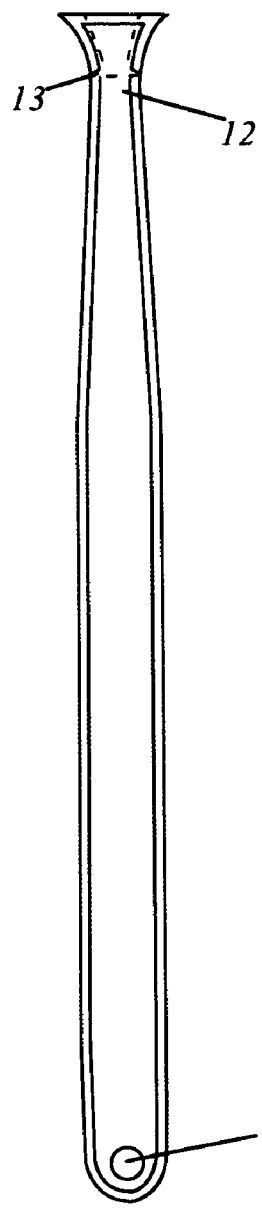

Referring now to FIGS. 1 and 2, views of the system 10 and an elongate handle portion 15 of the present invention is disclosed according to the preferred embodiment of the invention. The elongate handle portion 15 comprises a lightweight, solid, and sturdy ergonomic design formed in a long, narrow, and thin shape with a rounded bottom end and an opposite flared neck end 12. The rounded end has mounting means 11 formed therethrough, illustrated as such in FIGS. 1 and 2 as a hole for receiving a nail, hook, or other such device to hang and store the system 10. The opposite flared neck end 12 has means for accepting the connector of the head portion 20, illustrated herein as a groove 13 that roughly matches the corresponding flanged end 28 of the head portion 20. The flared end 12 is hollow up until the point at which the groove 13 is located; thereafter the elongate handle 15 is solid. The hollow flared neck end 12 has interior walls on opposing sides of both the hollow and the groove 13. A tapered neck portion 23 extends from the bottom central portion of the reinforcing solid portion 14 and is an extension thereof. The neck 23 tapers down to a formed flange 28 or similar structure roughly of the same diameter as that of the groove 13 located in the flared neck portion 12 of the elongate handle 15. The upper diameter of the tapered neck 23 should generally match that of the outer diameter of the flared neck 12 to provide a seamless connection when the head 20 is affixed to the handle 15. The swatting head 20 is substantially removably attached thereto the elongate handle 15 at the proximal end.

Figure 3A:
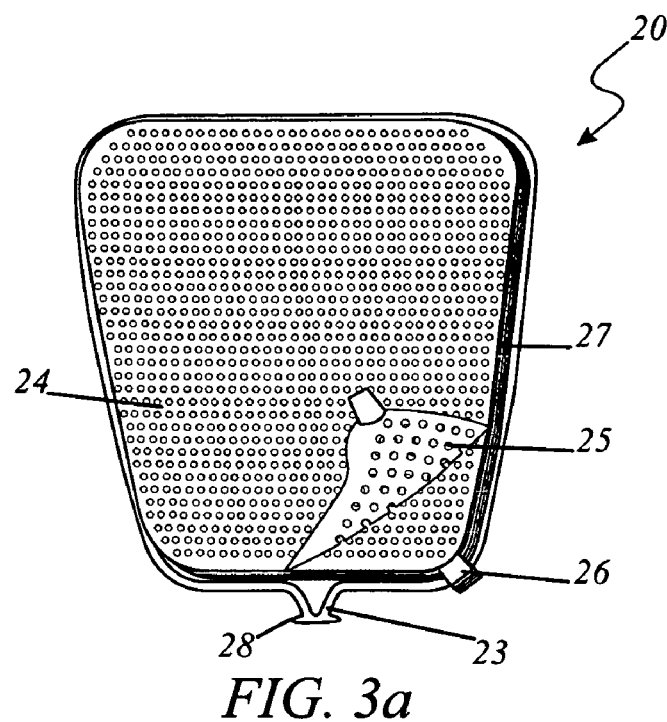
Figure 3B:
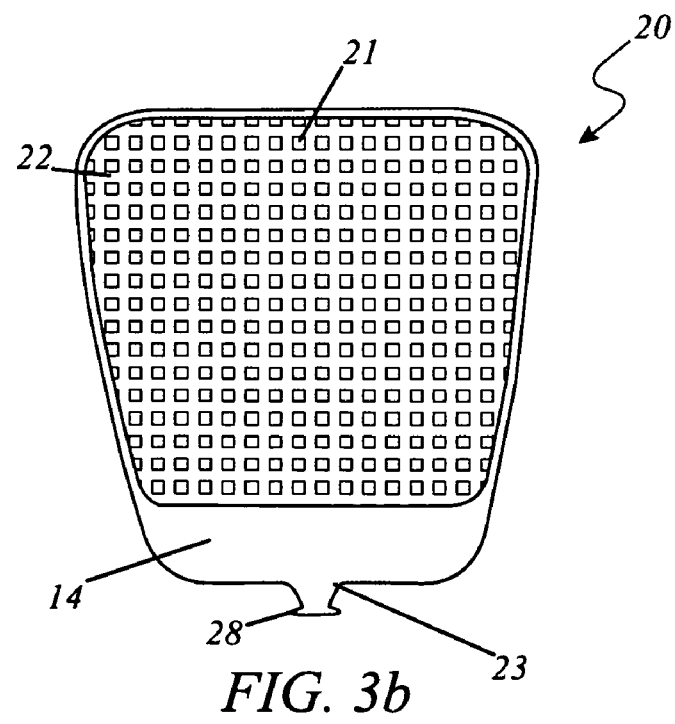

FIGS. 3a and 3b illustrate the head portion 20 of the system 10, which is shaped and sized in a generally trapezoidal structure typical to that seen in conventional fly swatter heads. The head 20 comprises a lightweight and sturdy material similar to that used for the elongate handle 15 and arranged in a grid-like or mesh pattern 22 with holes 21 to enable the user to generate additional speed during operation of the device. Formed across the bottom of the head 20, beneath the mesh grid pattern 22, is a reinforcing solid portion 14, providing weight, strength, and striking balance for the head 20.

Affixed to one (1) side of the head 20 is a stack of double-sided adhesive sheets 27. Each adhesive sheet 24 are adhesively coupled thereto the adjacent adhesive sheet 24. Specifically, each unitary sheet 24 comprises a front surface designed for striking and adhesively receiving an insect and a back surface designed to removably be attached to the front surface of the adjacent unitary sheet 24. Each unitary sheet 24 has a general shape to match that of the head 20 and has a pull tab 26 situated in a corner of the sheet 24 to facilitate removal of a single sheet 24. The pull tab 26 is devoid of adhesive to enable the user to manipulate the sheets 24 without having the sheet 24 adhere to the user's hand. The adhesive sheet 24 is typically thin and of a low density material with interstitial orifices 25 formed throughout the sheet 24 to facilitate removal of a single sheet 24 from the remainder of the stack 27. On both sides of the sheet 24 displaced thereon or impregnated therein is an adhesive comprising similar properties to that of conventional masking tapes and the like and need not be of a particular bond strength; although, a range of adhesives may generally be utilized for use with the system 10 without leaving the scope of the invention 10. It is envisioned that the entire sheet 24 is coated uniformly with adhesive; although, a plurality of adhesive distributions may be utilized such as, but not limited to, stripes, dots, grids, and more. The stack of adhesive pads 27 is replaceable in the system 10 as needed.

An alternate embodiment of the present invention 10 may disclose a stack of double-sided adhesive sheets 27 removably attached to each of the two (2) planar surfaces of the swatter head 20.

Another alternate embodiment of the present invention 10 may disclose usage of the system 10 to catch insects in mid-flight by swinging the system 10 relative to the handle portion 15 and the head portion 20 comes in contact with a fly, bee, or other insects of flight while in flight. The outwardly adhesive sheet 24 captures the fly, bee, or other insects of flight without coming in contact with a surface.

Yet another alternate embodiment of the present invention 10 may disclose an adhesive sheet 24 comprising a corrugated surface such as fibers spanning across said sheet 24 to provide an increased frictional engagement to the insect.

The preferred embodiment of the present invention can be utilized by the common user in a simple and effortless manner with little or no training. After initial purchase or acquisition of the system 10, it would be configured as indicated in FIGS. 1 through 3b.

It is a benefit of the present invention 10 to enable the user to collect and dispose of swatted insects and debris in a sanitary method. The head portion 20 is essentially a plastic injection-molded device formed as a mesh 22. On one side of the head portion 20 is a stack 27 of singularly disposed double-sided adhesive sheets 24. The head portion 20 is easily detachable from the elongate handle portion 15 by placing the head portion 20 within the flared neck 12 portion of the hollow upper body of the handle 15 until the flange 28 on the tapered neck 23 engages and rests therein the corresponding groove 13 within said handle 15.

Once the head 20 has been attached to the handle 15 the user utilizes the system 10 as one would use a conventional fly swatter—by grasping the handle 15 and bringing the head 20 down with the mesh side 22 in a striking motion onto the target insect. Once the insect has been struck, killed, and is prone, the user then grasps a single adhesive sheet 24 by the non-stick tab 26 and places it over said struck insect. The sheet 24 captures the insect and any fluid or parts expelled outwardly upon a successful strike. This enables the user to properly dispose of the struck insect in safe and sanitary way. The system 10 may be utilized to capture and/or exterminate a plurality of insects.

When the device is not in use, mounting means 11 is formed in the handle 15 on the opposite end of the head portion 20; typically envisioned to hang the device off a hook or similar apparatus.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A system to collect and dispose of swatted flies, other insects or bugs, and debris comprising:
    a head portion having a reinforcing portion that has a bottom central portion defining a bottom edge of said head portion, a tapered neck portion extending from a first end thereof at said bottom edge of said head portion to a second end thereof spaced below said bottom edge of said head portion, and two planar sides, said tapered neck portion tapering from said first end toward said second end, a connection flange at said second end of said tapering neck portion, said connection flange extending outwardly and away from said second end of said tapered neck portion such that opposed ends of said connection flange extend laterally beyond said second end of said tapered neck portion in directions perpendicular to said tapered neck portion;
    a mesh grid pattern of a plurality of grid holes extending through said head portion to generate additional speed during operation of said system;
    a replaceable stack of singularly disposed double-sided adhesive sheet pads, each of said sheet pads has a plurality of orifices and a pull tab mounted on each said sheet pad to facilitate removal of each said sheet pad from a remainder of said replaceable stack, said stack removably attached to one of said two planar sides of said head portion; and
    a detachable elongate handle having an upper end and a lower end which define a longitudinal axis of said handle therebetween, means for mounting formed on said lower end of said handle to hang said system off a hook or similar apparatus, a hollow flared neck portion at said upper end of said handle, said flared neck portion having a first end at said handle and extending to a second end thereof above said handle, said flared neck portion defining a groove therein at said first end for coupling to said head portion, said flared neck portion diverging outwardly in a direction perpendicular to said longitudinal axis from said first end of said flared neck portion to said second end of said flared neck portion, said handle engaged with and easily detachable from said head portion by placing said tapered neck portion and connection flange within said flared neck portion and said groove, wherein said groove is formed within interior walls of said flared neck portion of said handle and is detachably engaged with said second end of said tapered neck portion and said connection flange of said head portion, wherein said second end of said flared neck portion of said handle has a generally same width as said first end of said tapered neck portion of said head portion.

2. The system of claim 1, wherein said handle has a hand grip.

3. The system of claim 1, wherein said tapered neck portion and connection flange are an integral portion of said bottom portion of said head portion.

4. The system of claim 1, wherein said stack of double-sided adhesive sheets is removably attached to an other of the two planar surfaces of said head portion.

5. A method to collect and dispose of a target, such as swatted flies, other insects or bugs and debris, comprising the steps of:
    providing a system to collect and dispose of swatted flies, other insects or bugs, and debris comprising:
    a head portion having a reinforcing portion that has a bottom central portion defining a bottom edge of said head portion, a tapered neck portion extending from a first end thereof at said bottom edge of said head portion to a second end thereof spaced below said bottom edge of said head portion, and two planar sides, said tapered neck portion tapering from said first end toward said second end, a connection flange at said second end of said tapering neck portion, said connection flange extending outwardly and away from said second end of said tapered neck portion such that opposed ends of said connection flange extend laterally beyond said second end of said tapered neck portion in directions perpendicular to said tapered neck portion;
    a mesh grid pattern of a plurality of grid holes extending through said head portion to generate additional speed during operation of said system;
    a replaceable stack of singularly disposed double-sided adhesive sheet pads, each of said sheet pads has a plurality to orifices and a pull tab mounted on each said sheet pad to facilitate removal of each said sheet pad from a remainder of said replaceable stack, said stack removably attached to one planar side of said two planar sides of said head portion; and a detachable elongate handle having an upper end and a lower end which define a longitudinal axis of said handle therebetween, means for mounting formed on said lower end of said handle to hang said system off a hook or similar apparatus, a hollow flared neck portion at said upper end of said handle, said flared neck portion having a first end at said handle and extending to a second end thereof above said handle, said flared neck portion defining a groove therein at said first end for coupling to said head portion, said flared neck portion diverging outwardly in a direction perpendicular to said longitudinal axis from said first end of said flared neck portion to said second end of said flared neck portion, said handle engaged with and easily detachable from said head portion by placing said tapered neck portion and connection flange within said flared neck portion and said groove, wherein said groove is formed within interior walls of said flared neck portion of said handle and is detachably engaged with said second end of said tapered neck portion and said connection flange of said head portion, wherein said second end of said flared neck portion of said handle has a generally same width as said first end of said tapered neck portion of said head portion;

grasping the handle of the system and bringing the head portion down with said mesh grid pattern in a striking motion onto said target;

grasping a single adhesive sheet pad of said stack by said pull tab once the target has been struck, killed, and is prone; and placing said single adhesive sheet pad over said struck target to properly dispose of said struck target in a safe and sanitary way.

6. The method of claim 5, further comprising the step of using the system to catch and strike said target in mid-flight by swinging the system relative to said handle portion such that said head portion comes in contact with said target while in flight and said single adhesive sheet pad captures said target without coming in contact with a surface.

* * * * *